March 25, 1958 F. H. LUHDORFF ET AL 2,827,937
FEEDER FOR PEAR PEELER
Filed Aug. 19, 1953 8 Sheets-Sheet 1

FIG_1

INVENTORS
FREDERICK H. LUHDORFF
SHERMAN H. CREED
SYLVIO PUCCINELLI
BY Hans G. Hoffmeister.
ATTORNEY March 25, 1958 F. H. LUHDORFF ET AL 2,827,937
FEEDER FOR PEAR PEELER
Filed Aug. 19, 1953 8 Sheets-Sheet 3

FIG_7

FIG_4

INVENTORS
FREDERICK H. LUHDORFF
SHERMAN H. CREED
SYLVIO PUCCINELLI
BY Hans G. Hoffmeister
ATTORNEY

March 25, 1958     F. H. LUHDORFF ET AL     2,827,937
FEEDER FOR PEAR PEELER Filed Aug. 19, 1953     8 Sheets-Sheet 4

FIG_5

FIG_6

INVENTORS
FREDERICK H. LUHDORFF
SHERMAN H. CREED
SYLVIO PUCCINELLI
BY *Hans G. Hoffmeister*
ATTORNEY

FIG_8

FIG_14  FIG_16

FIG_15

FIG_17

FIG_13

INVENTORS
FREDERICK H. LUHDORFF
SHERMAN H. CREED
SYLVIO PUCCINELLI
BY Hans G. Hoffmeister

March 25, 1958  F. H. LUHDORFF ET AL  2,827,937
FEEDER FOR PEAR PEELER

Filed Aug. 19, 1953  8 Sheets-Sheet 8

FIG_18  FIG_19  FIG_20

FIG_21  FIG_22  FIG_23

FIG_24  FIG_25  FIG_26

INVENTORS
FREDERICK H. LUHDORFF
SHERMAN H. CREED
SYLVIO PUCCINELLI

BY Hans G. Hoffmeister
ATTORNEY

United States Patent Office 2,827,937
Patented Mar. 25, 1958

2,827,937

FEEDER FOR PEAR PEELER

Frederick H. Luhdorff, San Jose, Sherman H. Creed, Campbell, and Sylvio Puccinelli, San Jose, Calif., assignors to Food Machinery and Chemical Corporation, San Jose, Calif., a corporation of Delaware Application August 19, 1953, Serial No. 375,183

13 Claims. (Cl. 146—51)

The present invention pertains to a machine for handling fruit, and relates more particularly to a feed mechanism for preparation machines for pears and like fruit.

An object of the present invention is to provide a feed mechanism for pear preparation machines which may be loaded by the operator at a point removed from the cutting and stemming tools of the machine.

Another object is to provide a feed mechanism adapted to automatically move the pears into a predetermined position of alignment before carrying them through the pear processing stations.

Another object is to provide a feed mechanism for receiving the pears stem end down and for feeding them to horizontally disposed fruit holders of a pear preparation machine with their stem-blossom axes in alignment therewith.

Other and further objects and advantages of the present invention will become apparent to one skilled in the art from the following detailed description taken in connection with the accompanying drawings, in which.

Figure 1:
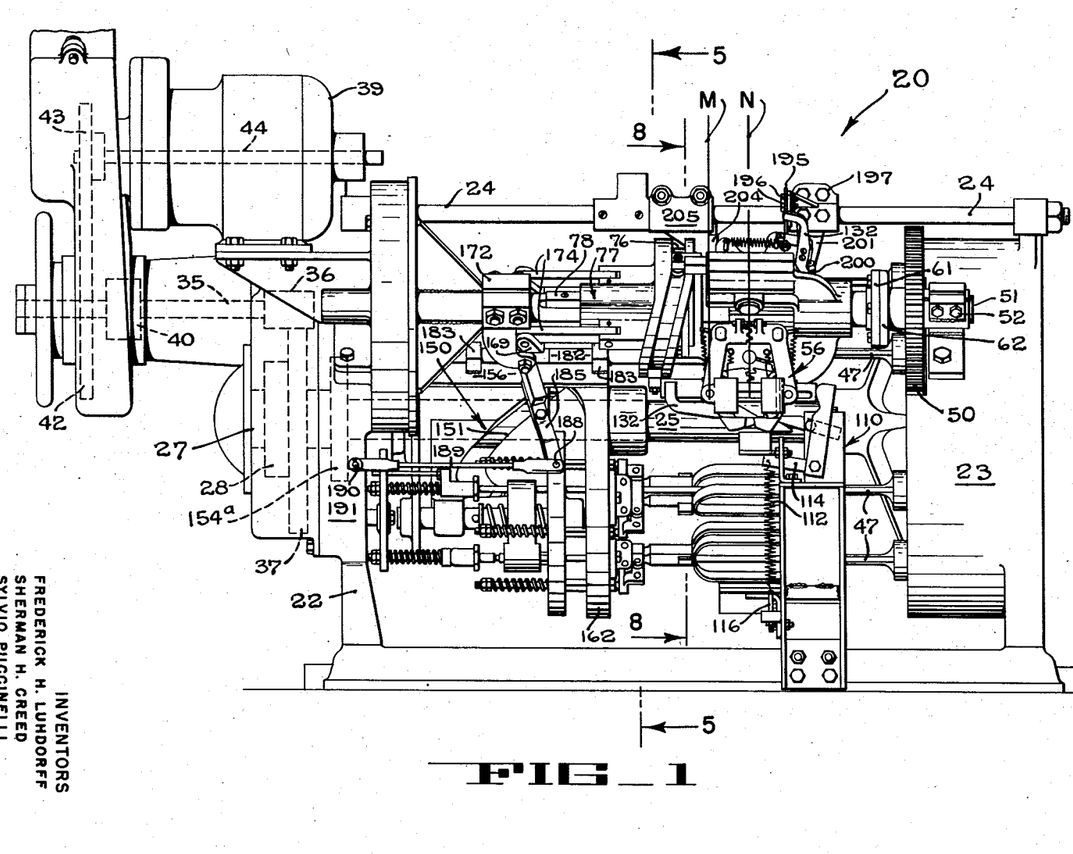
Fig. 1 is a side elevation of a pear preparation machine incorporating the pear feed mechanism of the present invention.
Figures 2, 3:
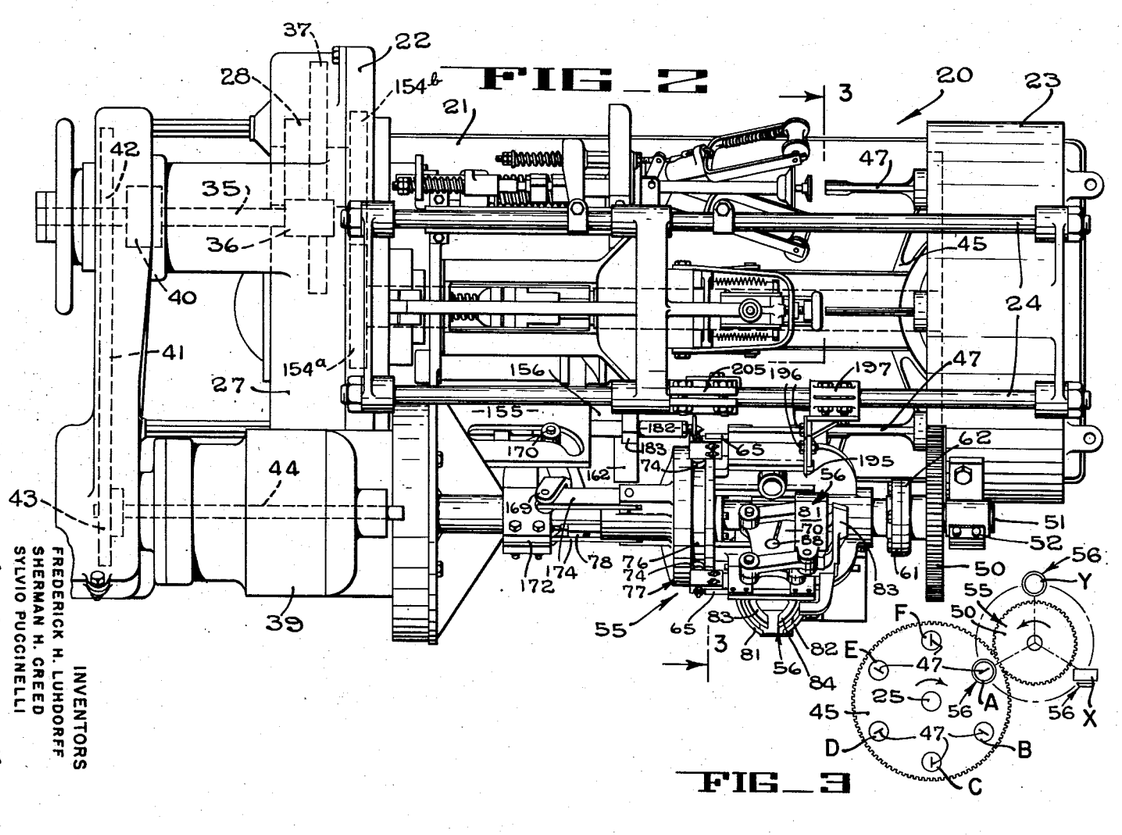
Fig. 2 is a plan of the machine of Fig. 1.
Fig. 3 is a diagrammatic view of the turret end of the machine, taken along lines 3—3 of Fig. 2.

In Figs. 1 and 2, the reference numeral 20 indicates generally a pear processing machine incorporating the novel rotary pear feed of the present invention. Those parts of this machine, that are not directly associated with the present pear feed mechanism, are fully disclosed in the U. S. patent to Thompson et al. 2,139,704. In general, the machine 20 comprises a rigid base 21 upon which is mounted a pair of end standards 22 and 23 rigidly interconnected by longitudinal tie rods 24. A turret shaft 25 extends between the end standards 22 and 23 and is suitably journalled for rotation in bearing members (not shown) in these standards.

Figure 4:
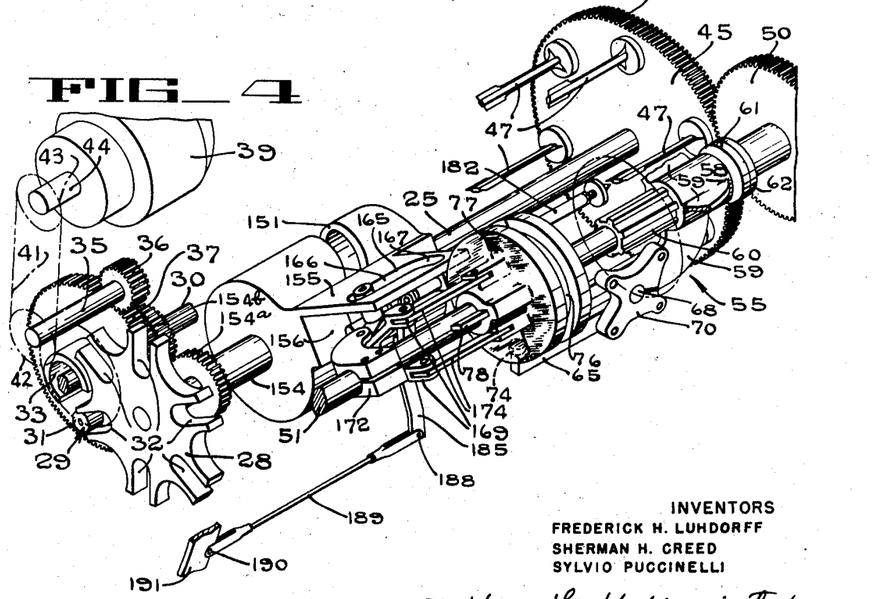
Fig. 4 is a diagrammatic perspective of the operating mechanism of the pear preparation machine of Fig. 1.

The turret shaft 25 projects beyond the end standard 22 into a gear chamber formed by a gear cover 27 secured to the outer flanged face of the end standard. The shaft 25 is intermittently rotated one-sixth of a revolution at a time by means of a Geneva gear 28 keyed thereto, as seen in Fig. 4. The Geneva gear 28 is actuated by a Geneva driver 29 keyed to a shaft 30 and carrying the usual driver roller 31 which engages with radial slots 32 in the Geneva gear 28 for rotating the same. When the driver roller 31 is out of engagement with the Geneva gear 28, the gear 28 is locked against rotation by a locking ring 33 carried by the driver 29. The Geneva movement is driven from a continuously rotating main drive shaft 35 (Figs. 1 and 2) by means of a pinion gear 36 which is secured to the shaft 35 and disposed in mesh with gear teeth 37 (Fig. 4) formed on the periphery of the Geneva driver 29. Power for operating the main drive shaft 35 is supplied from an electric motor 39 through a clutch 40 by means of a chain 41 trained around a sprocket 42 that is keyed to the driven shaft of the clutch and a sprocket 43 keyed to the drive shaft 44 of the motor 39.

Fixed to the turret shaft 25 near the right hand end, as viewed in Fig. 4, is a turret 45 provided with an annularly arranged series of stemming tubes 47, six in all in the illustrated embodiment, upon which the pears to be operated upon are impaled, stem end first, by a pear feeding mechanism to be described hereinafter. Gear teeth 49 are formed on the periphery of the turret 45 for meshing engagement with the teeth of a gear 50 rotatably mounted on a shaft 51. One end of the shaft 51 is held in fixed position by a clamp 52 mounted on end standard 23 while the other end of the shaft 51 is supported in the end standard 22. When the shaft 25 is intermittently rotated in a clockwise direction in one-sixth revolution increments through the above-mentioned Geneva drive, the stemming tubes 47 are carried through six successive stations A, B, C, D, E, and F, as shown diagrammatically in Fig. 3. At station A a pear is pressed onto each stemming tube which carries the pear through the succeeding stations wherein the pear is peeled, split, cored, and trimmed by mechanisms described fully in the above-mentioned patent to Thompson et al.

Figure 8:
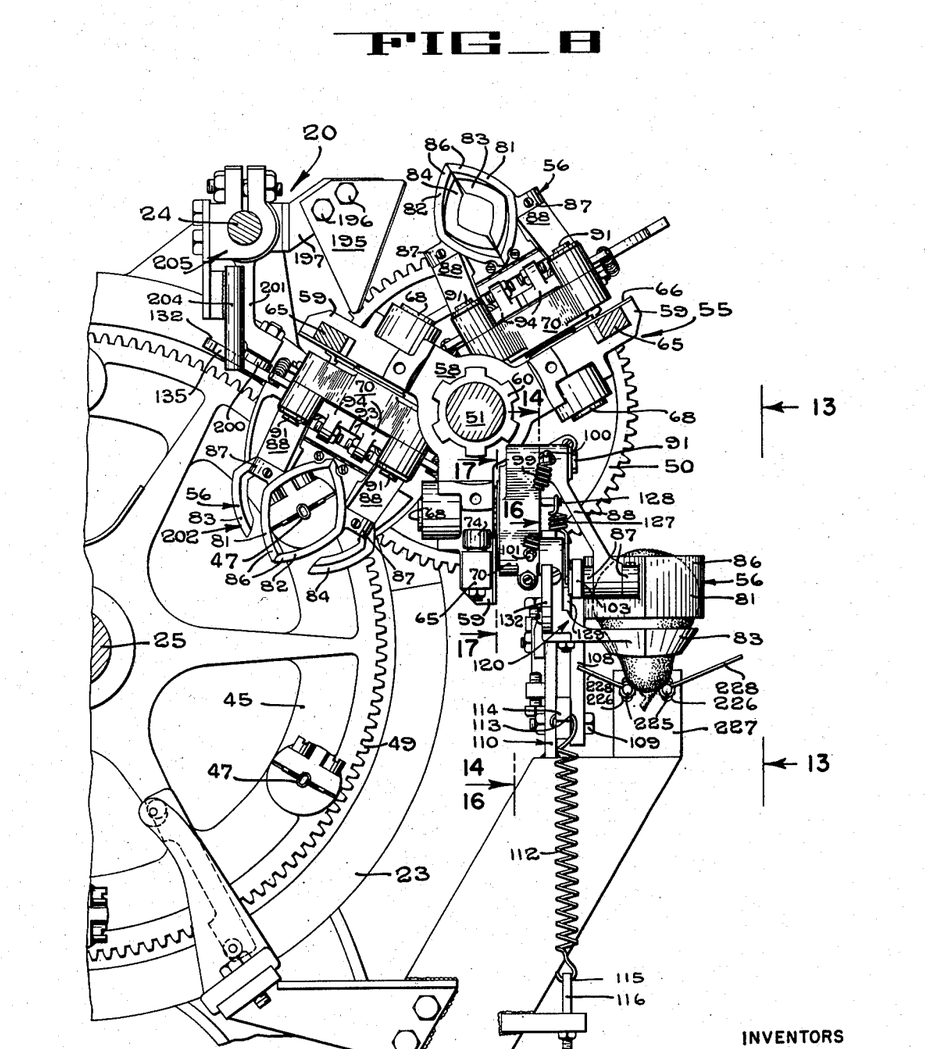
Fig. 8 is a fragmentary vertical section taken on lines 8—8 of Fig. 1.
Figures 9, 10, 11, 12:
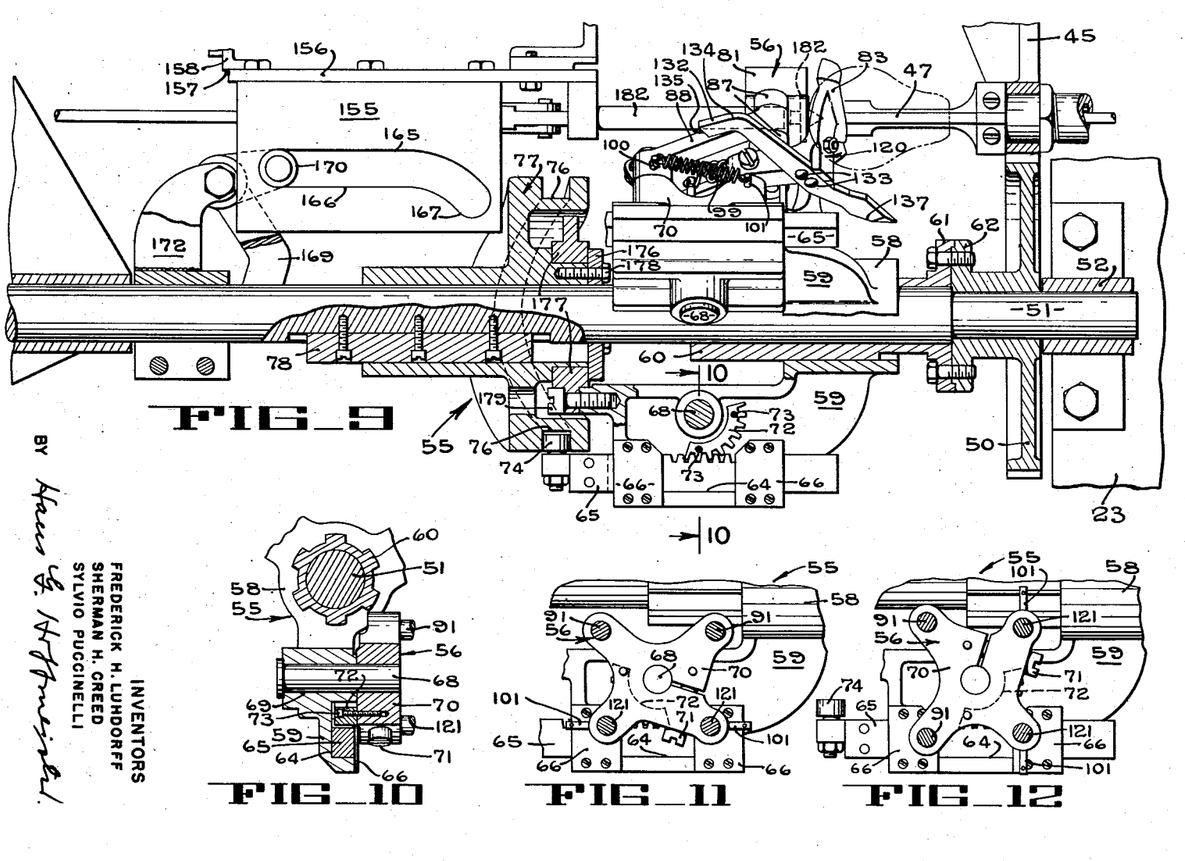
Fig. 9 is a fragmentary section taken along lines 9—9 of Fig. 5, with parts in elevation and parts broken away to more clearly disclose the mechanism.
Fig. 10 is a fragmentary section taken along lines 10—10 of Fig. 9.
Figs. 11 and 12 are fragmentary elevations of a portion of Fig. 9, illustrating two operating positions of the mechanism.

The present invention has to do with an improved pear feeding mechanism 55 (Fig. 3) by which a pear is carried in a cup assembly 56 from a loading station X through an idler station Y to the pear transfer station A at which the pear is pressed onto a stemming tube 47. The pear feed mechanism 55 comprises a hub 58 (Figs. 4, 8, and 9) having three equi-spaced, radially extending arms 59. The hub 58 is slidably mounted on a spline sleeve 60 which is rotatably disposed on the shaft 51. The sleeve 60 has a flanged end 61 (Fig. 9) secured to a flange 62 on the gear 60 so that rotation of the gear 50 causes rotation of the sleeve 60 and rotation of the hub 58. Each arm 59 (Figs. 9 and 10) has a groove 64 in which a rack 65 is held in sliding relation by two spaced retainer plates 66 (Fig. 9). A shaft 68 is rotatably journalled in a transverse opening 69 in the arm 59 and carries a split mounting plate 70 which is clamped on the shaft by a capscrew 71 (Fig. 11). A gear segment 72 (Figs. 9 and 11) is disposed in concentric relation between the arm 59 and the mounting plate 70 and is secured to the plate 70 by bolts 73. Thus, when the rack 65 is moved toward the left from the position of Fig. 11 to the position of Fig. 12, the gear segment 72 and the mounting plate 70 will be rotated counterclockwise 90° to the position of Fig. 12. As will be apparent presently, this 90° rotation of the plate 70 causes a 90° swinging movement of a pear carrying cup, moving the pear in the cup from a vertical position to a horizontal position.

The rack 65 is reciprocated by means of a roller follower 74 (Fig. 9) mounted in offset relation at the end of the rack. The follower 74 is disposed in a curved camming groove 76 in a barrel cam 77 which is keyed to the stationary shaft 51 by a key 78 slidably disposed in a groove 79 in the barrel cam 77. As each arm 59 is rotated in one-third revolution increments, the associated follower 74 moves along the curved camming groove 76 to impart a reciprocating movement to the rack 65.

The cup assembly 56 is pivotally mounted on the forward face of each mounting plate 70. Each cup assembly 56 (Fig. 13) includes a pair of upper jaws 81 and 82 and a pair of lower jaws 83 and 84, each pair of jaws being operable independently of the other pair. Each of the upper jaws 81 and 82 comprises a substantially semi-cylindrical jaw portion 86 best seen in the topmost cup assembly of Fig. 8. The opposed jaw portions 86 cooperate to define an opening adapted to receive the large, butt end of a pear. Each jaw 86 has two outwardly projecting spaced ears 87 (Figs. 8 and 13) between which the lower end of a bellcrank 88 is pivotally connected by a pin 89. The bellcranks 88 are pivotally mounted centrally by pins 91 to the mounting plate 70 and are provided with meshing teeth 93 at confronting outer ends 94 so that pivoting movement of one bellcrank will cause simultaneous movement of the other bellcrank. Each bellcrank is urged toward a jaw closing position by a spring 99 connected between a pin 100 secured to the bellcrank and a pin 101 secured to the mounting plate 70. The bellcranks 88 are pivoted toward jaw-open position by a slotted push rod 103 which is mounted on the rear side of the upper jaws 81 and 82, as seen in Fig. 14, which is a view of the rear side of the cup assembly 56 with the lower jaws 83 and 84 removed and the mounting plate 70 shown in phantom lines. The push rod 103 is pivotally connected at 105 to the lower end of one bellcrank 88 and receives, in guiding relation, the end 106 of one of the pins 89 extending from the other bellcrank 88. A stop bar 108 is pivotally mounted by a bolt 109 to a pedestal 110 which extends upwardly from the base 21, as seen in Fig. 1. A spring 112 is connected at 113 to an arm 114 (Fig. 13) of the stop bar 108 and at 115 (Fig. 1) to a pin 116 adjustably secured to the pedestal 110. As will be explained presently, in operation, the cup assembly 56 (Fig. 13) is shifted bodily longitudinally of the machine until the push rod 103 contacts the stop bar 108 which initially yields due to the spring 112 but finally resists movement of the push rod 103 and, as the cup assembly 80 continues to move, the stop bar moves the upper jaws 81 and 82 to open position. Adjustable setscrews 117 (Fig. 13), threaded in opposed ears 118 on the end portions 94 of the bellcranks 88, are arranged to abut each other to limit the pivoting movement of the bellcranks in jaw-opening direction.

Figures 13, 15, 17:
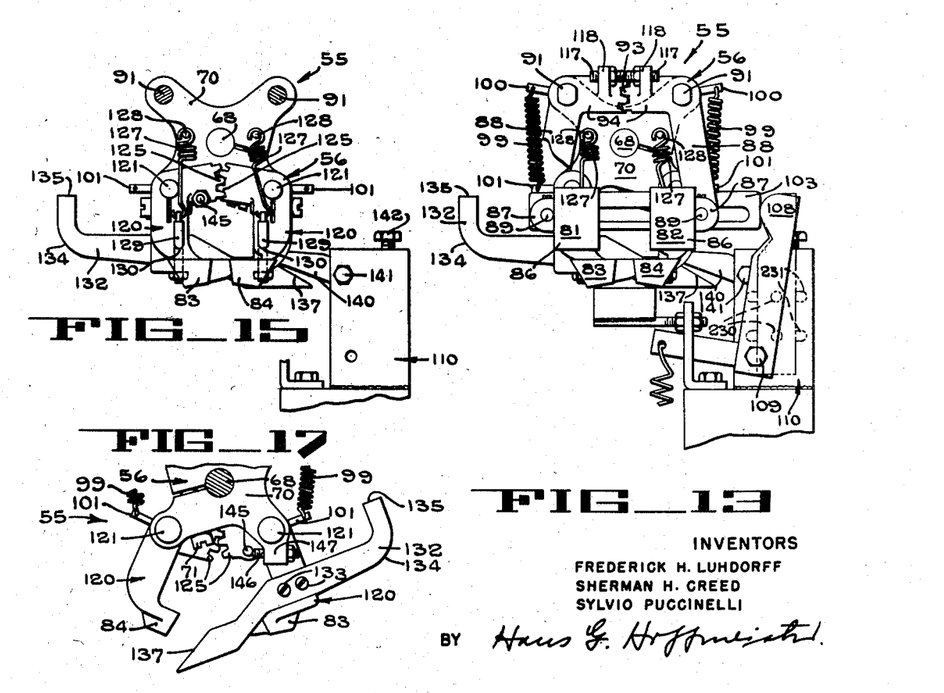
Fig. 13 is a fragmentary side elevation of a cup assembly, viewed in the direction of the arrows 13—13 of Fig. 8.
Fig. 15 is a fragmentary side elevation of the cup assembly, similar to Fig. 13, but having the upper jaws removed to disclose the structure of the lower jaws.
Fig. 17 is a section taken on line 17—17 of Fig. 8 showing a rear view of the plate on which the cup assembly is mounted.
Figure 14:
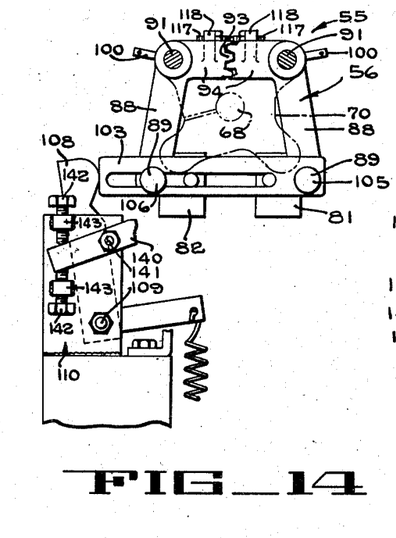
Fig. 14 is a fragmentary vertical section taken along lines 14—14 of Fig. 8, with parts shown in phantom lines, showing a rear view of the cup assembly with the lower jaws removed.
Figure 16:
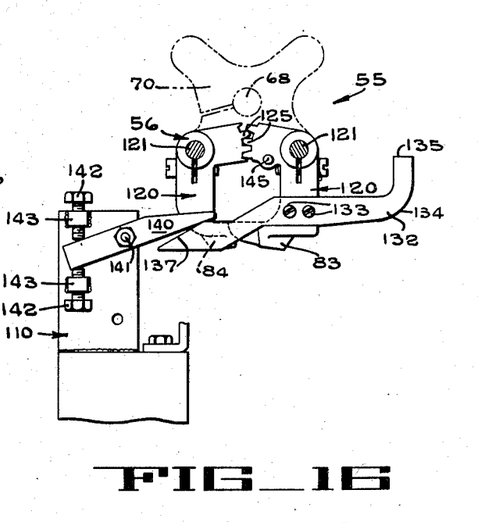
Fig. 16 is a section taken along lines 16—16 of Fig. 8, with parts in phantom lines, and showing a rear view of the lower jaw assembly of the feed mechanism.

The lower jaws 83 and 84 are illustrated in Figs. 15 and 16, Fig. 15 showing a front view of the cup assembly 56 with the upper jaws 81 and 82 removed and Fig. 16 showing a rear view of the same cup assembly with the mounting plate 70 shown in phantom lines. Each lower jaw comprises a bellcrank 120 pivotally mounted on the mounting plate 70 by a pin 121 to which the bellcrank is clamped. At its lower end each bellcrank 120 carries a forwardly extending, generally semi-cylindrical jaw portion 83 or 84, best seen in the topmost cup assembly 56 of Fig. 8. The opposed jaw portions 83 and 84 cooperate to define an opening through which the relatively small stem end of the pear extends. Gear teeth 125 (Fig. 15) are formed on the upper end of each bellcrank 120. The teeth 125 of the bellcranks 120 are in mesh so that rotation of one bellcrank will cause rotation of the other. Each bellcrank is urged in jaw closing direction by a spring 127 connected between a pin 128 on the plate 70 and an adjustment screw 129 which extends through an opening 130 (Fig. 12) in the lower end of the bellcrank 120. The bellcranks are pivoted in jaw-opening direction by means of an arm 132 (Fig. 16) which is secured to the rear face of one of the bellcranks by capscrews 133. The arm 132 has a curved camming surface 134 adjacent a flat abutment end face 135. At its opposite end, the arm 132 has a slanted camming edge 137 adapted to engage a fixed arm 140 secured to the pedestal 110 by a bolt 141. Screws 142, threaded through ears 143 projecting outwardly from the pedestal 110, engage opposite sides of the cam arm 140 to define the adjusted position of the arm. Movement of the bellcranks 120 in jaw-opening direction is limited by a capscrew 145 (Fig. 17) which extends through one of the bellcranks 120 and is arranged to contact a setscrew 146 threaded in an extension 147 of the plate 70.

While at the pear feeding station X (Fig. 3), the cup assembly 56 moves between two longitudinal positions which are indicated by the reference lines M and N on Fig. 1. In longitudinal position M, which is furthest to the left in Fig. 1, the jaws of the cup assembly are closed. When the cup assembly is moved to position N, the upper jaws are opened by the contact of the slotted push rod 103 with the spring-loaded lever 108, and the lower jaws are partially opened by the contact of the slanted cam surface 137 with the cam arm 140. With both sets of jaws open, the cup assembly is ready to receive a pear stem end down as shown in Fig. 8.

Each cup assembly is moved longitudinally to the right to pear receiving position N by means of a cam cylinder 150 (Fig. 1) which is slidably supported on a sleeve 154 rotatably mounted on the main shaft 25. The cam cylinder 150 has a camming slot 151 which receives a roller 152 (Fig. 5) mounted on the end of a rod 153 projecting radially from the sleeve 154. A gear 154a (Fig. 4) is keyed to the sleeve 154 and disposed in mesh with a gear 154b keyed to the continuously rotating shaft 30. The camming slot 151 extends part way around the cylindrical barrel cam in a plane at right angles to the axis of the cylinder and the remainder of its length includes a pair of reversely related angular portions. With this configuration of the cam slot, it will be apparent that, while the sleeve 154 rotates continuously, the cam cylinder itself is only intermittently reciprocated, since it is only actuated during part of each revolution of the sleeve. The disposition of the cam slot with relation to the drive mechanism is such that the cam cylinder remains stationary during rotative movements of the turret 45 and the feeding mechanism 55, and is advanced and retracted during the periods intervening between the intermittent rotative movements of the turret and the feeding mechanism 55.

Figure 5:
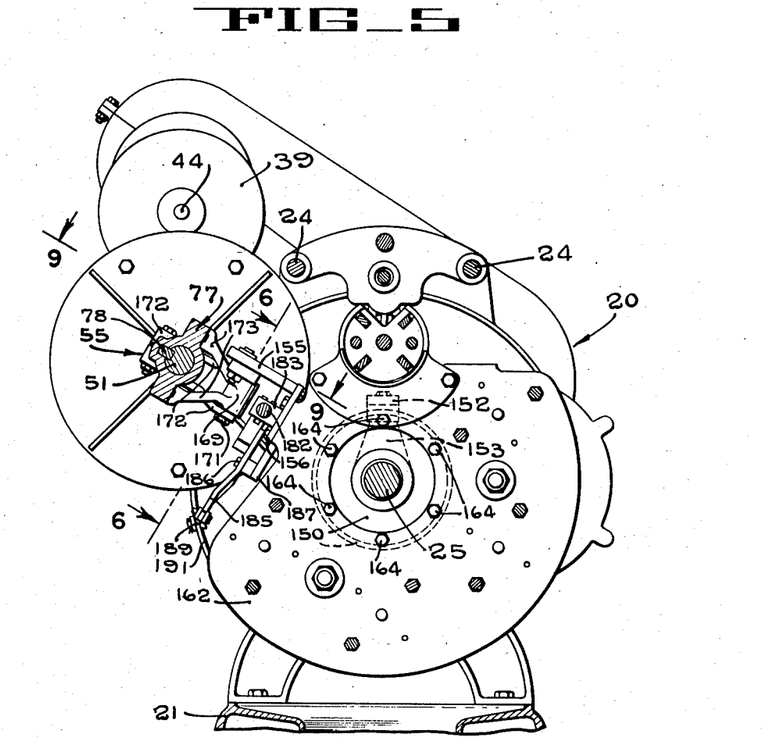
Fig. 5 is a vertical section taken along lines 5—5 of Fig. 1.
Figure 6:
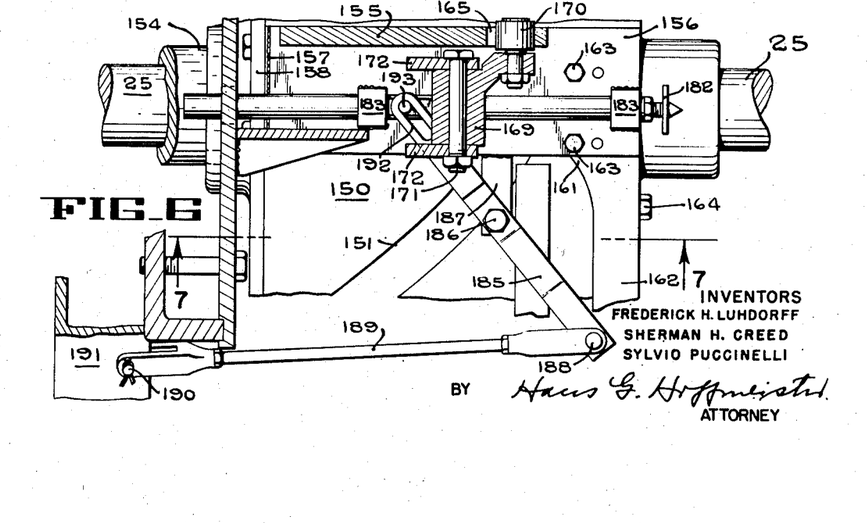
Fig. 6 is a section taken along lines 6—6 of Fig. 5.
Figure 7:
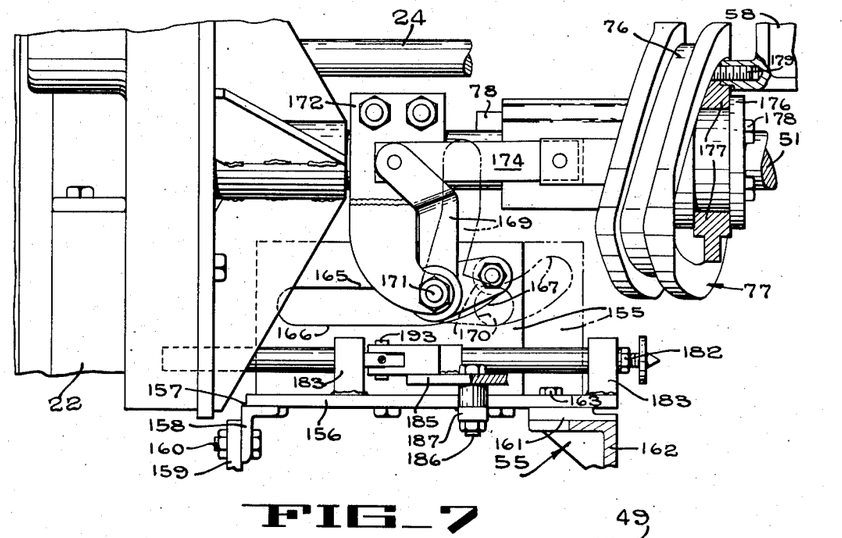
Fig. 7 is a section taken along lines 7—7 of Fig. 6.

Longitudinal movement of the cylindrical cam 150 is transmitted to the cup assembly 56 through a cam plate 155 (Figs. 5 and 6) which extends at right angles from a plate 156. At one end the plate 156 is welded, as at 157 (Fig. 6), to an angle bracket 158 (Fig. 7) that is secured to a mounting member 159 which in turn is secured to the cam 150 by bolts 160. At its opposite end the plate 156 is secured to a longitudinal flange 161 (Fig. 6) of a transverse bulkhead 162 by bolts 163. The bulkhead 162 is secured by bolts 164 to the end surface of the cylindrical cam 150. Thus, as the cylindrical cam is reciprocated longitudinally on the shaft, it carries the cam plate 155 back and forth longitudinally. The cam plate 155 (Fig. 7) has a longitudinal camming slot 165 therein which comprises a straight portion 166 and a forward curved portion 167. A bellcrank 169 has a roller 170 rotatably mounted at one end and adapted to move in the longitudinal slot 165. The bellcrank is pivotally mounted at 171 to an arm 172 that is rigidly clamped on the stationary shaft 51. As best seen in Fig. 5, one end of the bellcrank 169 consists of a pair of spaced arms 173 which are pivotally connected to links 174 (Fig. 4) extending longitudinally of the stationary shaft 51 on each side thereof. At their forward ends the links 174 are pivotally connected to the hub of the barrel cam 77. Referring again to Fig. 7, it will be noted that, when the cam plate 155 has been moved toward the left by the cylindrical cam 150 to the position shown in full lines, the bellcrank roller 170 rides up into the curved portion 167 of the cam slot 165 causing the bellcrank 169 to pivot counterclockwise and draw the barrel cam 77 to the left. The hub 58, which carries the cup assemblies 56, is locked to the cam 77 by interengaging rings 176 and 177 (Fig. 9), the ring 176 being secured to the cam 77 by capscrews 178 and the ring 177 being secured to the hub 58 by capscrews 179. Thus, when the bellcrank roller 170 (Fig. 7) rides into the curved end of the camming slot 165, the hub 58 and the cup assemblies mounted thereon are moved toward the left to position M (Fig. 1). When the cam plate 155 (Fig. 16) is moved toward the right by the barrel cam 150, the bellcrank roller 170 is forced into the straight portion 166 of the camming slot 165 to effect a clockwise rotation of the bellcrank to the dotted line position. This clockwise rotation of the bellcrank moves the cup assemblies 56 to the right to the pear-receiving position N (Fig. 1).

At station A (Fig. 3) a pear, which has been delivered thereto by a cup assembly, is pushed out of the cup and onto a stemming tube 47 by a pusher 182 (Fig. 4) that is mounted in longitudinal alignment with the stemming tube at station A. The pusher 182 is mounted for sliding longitudinal movement in a pair of spaced, apertured tabs 183 (Figs. 6 and 7) which project outwardly from the plate 156. When the plate 156 is reciprocated, it carries the pusher 182 bodily forward and backward. However, since the pusher 182 must travel a considerable distance as it pushes the pear out of the cup and onto the stemming tube, means is provided for giving the pusher an additional forward movement. This means comprises a lever 185 (Fig. 6) pivotally connected intermediate its ends by a pin 186 to an arm 187 secured to the plate 156. At its outer end, the lever 185 is connected by a pivot pin 188 to a link 189 pivotally mounted at 190 to a fixed frame member 191. At its inner end, the lever 185 has a slot 192 in which a peg 193, projecting from the pusher 182, is slidably disposed. When the plate 156 is moved toward the right in Fig. 6, the lever 185 is carried bodily to the right and is simultaneously pivoted about pivot pin 186 and the pivot pin 188, causing the inner end of the lever 185 to impart a forward movement relative to the plate 156.

A cutting blade 195 (Fig. 8) is secured by set-screws 196 to a bracket 197 that is clamped to one of the longitudinal tie rods 24. The blade 195 is relatively flat and is disposed in a plane substantially normal to the axis of the stationary shaft 51. The blade 195 is so positioned longitudinally of the machine relative to the rotary path of travel of a cup assembly 56 as it moves from position Y to A (Fig. 3) that the stem end of a pear, projecting from a cup that is moving between these positions, will be cut off as it passes the blade. With reference to Fig. 8, it will be noted that the pear is disposed in a vertical position when held at feeding station X, is moved to a horizontal position as it is delivered to station Y, and remains in the horizontal position as it passes the blade 195 on its way to the pear transfer station A.

An abutment roller 200 (Fig. 8) is rotatably mounted on an arm 201 extending downwardly from the bracket 197. The roller 200 is so positioned that, when a cup assembly 56, at the pear transfer station A, is moved from the retracted position M (Fig. 1) to the forward position N, the camming surface 134 (Fig. 13), on the arm 132 connected to the lower jaws 83 and 84, will contact the roller 200 and cause opening of the lower jaws to wide open position, indicated at 202 in Fig. 8. On the return stroke of the cup assembly 56 from position N to M, the forward edge 135 (Fig. 13) of the arm 132 will abut a stop pin 204 (Fig. 8) which is secured in depending relation from a bracket 205. Contact of the edge 135 with the pin 204 causes closing movement of the lower jaws.

*Operation*

When the electric motor 39 (Fig. 4) is energized, the continuous rotation of the shaft 30 is begun. Through the Geneva drive the turret 45 is intermittently rotated in one-sixth of a revolution increments to move each stemming tube successively through the various processing stations A, B, C, D, E, and F (Fig. 3), station A being the station at which a pear is transferred from a cup assembly 56 (Fig. 3) to a stemming tube. Each time the turret 45 is rotated one-sixth of a revolution, the hub 58 of the feed mechanism 55 is rotated one-third of a revolution around the stationary shaft 51 to progressively move a cup assembly 56 from station X at which the pear is placed in the cup, to the idler station Y, and then to the pear transfer station A. During the periods intervening between each intermittent rotation of the turret 45 and the hub 58, the cam cylinder 150 is advanced and retracted.

Figure 18:
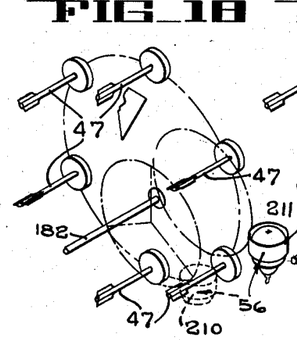
Figs. 18 to 26 inclusive are a series of diagrammatic operational views showing consecutive stages in the movement of a cup assembly during a typical operating cycle.
Figures 19, 20:
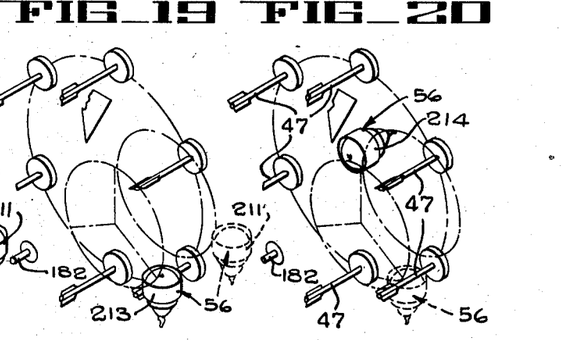

A complete cycle of operation of one cup assembly will be described in connection with Fig. 1, Fig. 2, and the diagrammatic views, Figs. 18 to 26 inclusive. In Fig. 18, a cup assembly 56 is shown in dotted lines in its retracted position 210, corresponding to position M of Fig. 1. As the cam cylinder 150 is moved to the right under the urging of the continuously moving radial rod 153, it carries the hub 58 (Fig. 4) to the right through the action of the bellcrank 169, the links 174, and the cam disc 77. Thus, all three cup assemblies are moved to their forward position N. As the cup assembly 56 moves from the dotted line position 210 of Fig. 18 to the full line position 211, the upper jaws are opened by the contact of the slotted push rod 103 (Fig. 1) with the spring loaded arm 108 and the lower jaws are moved to partially open position by the contact of the slanted camming edge 137 of the arm 132 with the cam arm 140. After a pear has been placed in the cup stem-end down by the operator, the cup assembly remains motionless in the dotted line position 211 (Fig. 19) until the cylindrical cam 150 starts its return movement toward the left (Fig. 1) at which time the cup assembly is moved to the left. As the jaw opening camming surfaces are disengaged from the cams, the springs associated with the jaws urge them toward closed position to grip the pear. When the cup reaches the full line position 213 of Fig. 19, the pear is securely gripped in readiness for the 90° swinging movement of the cup assembly which occurs as the hub 58 is indexed one-third revolution about the stationary shaft 51. As this indexing takes place, the roller follower 74 (Fig. 9), moving in the camming groove 76 of the cam disc 77, causes movement of the rack 65 with the resulting 90° rotation of the plate 70 on which the cup is mounted.

Figure 21:
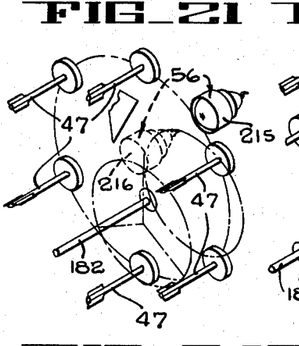
Figures 22, 23:
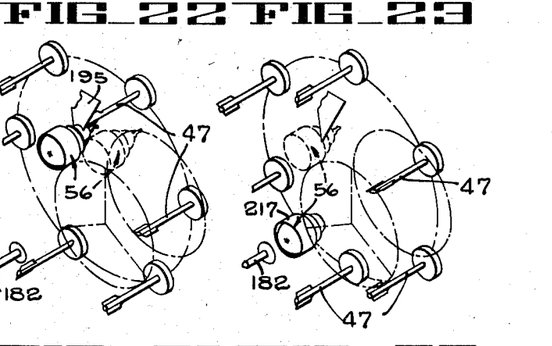
Figures 24, 25, 26:
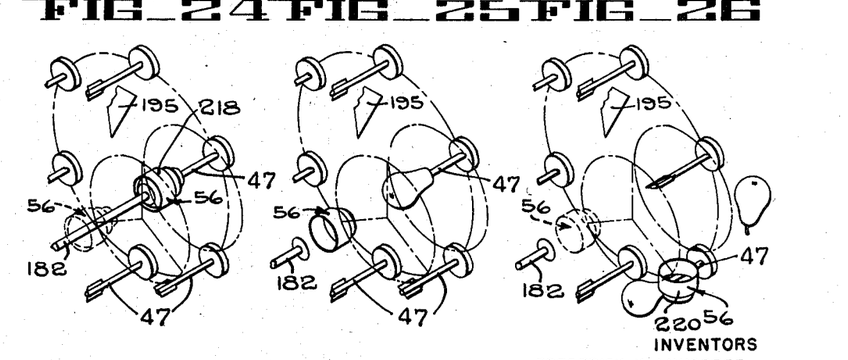

When the cup reaches the horizontally disposed position 214 (Fig. 20), it remains motionless until the cylindrical cam 150 is moved forwardly the second time, at which time it is carried to the idling position 215 of Fig. 21. On the second return movement of the cylindrical cam 150, the cup is moved to the dotted line position 216 of Fig. 21 in readiness for the second one-third revolution of the hub 58. This second one-third revolution of the hub moves the pear past the knife blade 195 which severs the stem end from the pear as shown in Fig. 22. When the pear reaches position 217 (Fig. 23), it remains motionless until the cylindrical cam 150 is moved forwardly for the third time. As the cup moves from the full line position 217 of Fig. 23 to the full line position 218 of Fig. 24 the lower jaws are moved to wide open position shown at 202 in Fig. 8 by the abutment of the camming surface 134 of the arm 132 with the roller 200. When the lower jaws are open, the pusher 182 which is being advanced by the forward movement of the plate 156 and by the action of the pivoting lever 185, overtakes the pear in the cup and pushes it out from between the upper jaws and onto a stemming tube 47, as illustrated in Figs. 24 and 25. On the third return stroke of the cylindrical cam 150, the pusher 182 is retracted and the empty cup assembly is returned to its rearward position. As the cup assembly moves toward the rearward position, the lower jaws are closed by the abutment of the leading edge 135 of the arm 132 with the fixed stop 200 (Fig. 8).

The third one-third revolution of the hub 58 moves the cup to the original pear feeding station X. As the hub 58 is moved toward station X, the cup is pivoted 90 degrees about the axis of the rod 68 to the vertical position 220 shown in Fig. 26 and Fig. 18. Thus, the cup assembly completes its cycle of movement during one rotation of the hub 58 and three reciprocating movements of the cylindrical cam 150.

With reference to Fig. 8, it should be observed that, when the pear is dropped in the cup assembly 56 by the operator, it comes to rest on two spaced, gauging pins 225 which are mounted for vertical adjusting movement in slots 226 in a mounting plate 227 extending upwardly from the pedestal 110. The gauging pins 225 are so spaced that the stem end of the pear will project a short distance below the pins and will be clamped in this position by the jaws of the cup assembly. When the cup is swung 90° to carry the pear to a horizontal position and then moved past the stationary knife 195, a predetermined amount of the stem end of the pear will be cut off. While the extent to which the stem end of a pear projects past the gauging pins 225 will depend more or less upon the size and configuration of the pear, the portions cut from the pears will as an average be substantially the same. The gauging pins 225 carry flat, outwardly projecting flaps 228 which guide the stem of the pear into the space between the gauging pins.

As the pear is dropped stem-end-down into the cup at the feeding station, the pear is received by the lower jaws and preliminarily centered. Subsequently, the upper jaws close on the pear and move it to an upright position with the stem-blossom axis of the pear extending vertically. When the cup is rotated 90°, the pear will be automatically moved to a horizontal position and then aligned with a horizontal stemming tube. Thus, in the embodiment illustrated, the upper jaws open before the lower jaws and close after the lower jaws. In another desirable arrangement, the upper jaws may be made to open last and close first. This can be accomplished by locking the stop bar 108 in fixed position, as shown in dotted lines in Fig. 13, as by means of suitable bolts (not shown) engaged through holes 230 in the bar 108 and mating slots 231 in the pedestal 110. In this arrangement the position of the stop bar 108 will be selected so that the bar 108 does not move the upper jaws to open position until the lower jaws have been opened by cam arm 132.

In Fig. 8, it will be noted that, when the operator places the pear in the cup, he is at some distance from the knife 195 and completely removed from any moving part of the mechanism.

From the foregoing description, it will be appreciated that in the present invention there is provided an efficient pear feed mechanism that not only eliminates the possibility of injury to the operator, but also assures accurate alignment of the pear with the stemming tubes and the removal of a predetermined optimum amount of the stem end of the pear during the feeding operation.

It will be understood that the invention is not limited to the precise details of construction illustrated but that various modifications and variations may be resorted to without departing from the spirit or scope of the invention, and we deem ourselves entitled to all such modifications and variations as come within the scope of the appended claims.

We claim:

1. A mechanism for feeding a pear to a stemming tube comprising means for holding the stemming tube with its axis in fixed position, a shaft mounted in parallel relation to the axis of said stemming tube, a cup mounted on said shaft the rotation about the axis thereof and for pivotal movement about an axis perpendicular to the axis thereof and adapted to receive and retainingly grip a pear with the stem-blossom axis of the pear displaced a fixed angular distance from a position parallel to the axis of the stemming tube, means connected to said cup for pivoting said cup about said axis perpendicular to the axis of said shaft through said fixed angular distance to bring the stem-blossom axis of the pear into parallel relation with the axis of the stemming tube, means connected to said cup for rotating the cup about the axis of said shaft, and means controlling rotation of the cup to stop the same when the axis of the pear is in alignment with the axis of the stemming tube.

2. A mechanism for feeding an individual piece of fruit to a fruit holder having an axis of symmetry, means for mounting the fruit holder with its axis in a fixed position, a cup adapted to receive and retainingly engage a piece of fruit with the core axis of the fruit in a vertical position and displaced a fixed angular distance from parallelism with the axis of the fruit holder, a shaft mounted in parallel relation to the axis of said fruit holder, means mounting said cup on said shaft for rotational movement about the axis thereof and for pivotal movement about an axis perpendicular to the axis of said shaft, means for pivoting said cup through said fixed angular distance to bring the axis of the fruit into a position parallel to the axis of the fruit holder, means connected to said cup for rotating the cup about the axis of said shaft, and means for controlling the rotation of said cup to stop the rotation thereof when the axis of the fruit is aligned with the axis of the fruit holder.

3. A mechanism for feeding a pear to a stemming tube having an axis in a horizontal plane comprising a shaft mounted in parallel relation to the axis of the stemming tube, a cup mounted for rotational movement about the axis of said shaft and adapted to receive and retainingly engage a pear with the stem-blossom axis of the pear in a vertical position, means mounting said cup for swinging movement through 90° about an axis perpendicular to the axis of said shaft to bring the stem-blossom axis of the pear in said cup into a horizontal position, means connected to said cup for rotating said cup about the axis of said shaft, and means controlling the rotation of said cup about said shaft to stop said rotation when the stem-blossom axis of the pear is aligned with the horizontal axis of the stemming tube.

4. A fruit feeding mechanism comprising a fruit holder adapted to receive a fruit presented to the holder in a horizontal direction, a horizontal shaft mounted in parallel relation to the axis of said fruit holder, a cup mounted for rotation about the axis of said shaft and adapted to receive and retainingly engage a piece of fruit with the core axis of the fruit in a vertical position, means mounting said cup for swinging movement through 90° about an axis perpendicular to the axis of said shaft to bring the axis of the fruit in said cup into a horizontal position, means connected to said cup for rotating the cup bodily about the axis of said shaft, and means controlling the rotational movement of said cup about said shaft to stop the rotation when the axis of the fruit is aligned with the axis of the fruit holder.

5. A mechanism for feeding a pear to a stemming tube comprising means for holding the stemming tube with its axis in fixed position, a shaft mounted in parallel relation to the axis of said stemming tube, a cup mounted for rotational movement about the axis of said shaft and adapted to receive a pear and retainingly position it with the stem-blossom axis having a predetermined angular displacement from a position of parallelism with the axis of the stemming tube and with the stem-blossom axis displaced from the stemming tube in a direction transverse to the axis of the tube, means mounting said cup for limited pivotal movement about an axis perpendicular to the axis of said shaft through said predetermined angular displacement, and means connected to said cup for simultaneously rotating said cup about the axis of said shaft to carry the axis of the pear toward a position of alignment with the axis of the stemming tube and pivoting said cup about its pivotal axis through said predetermined angular displacement to move the axis of the fruit to a position parallel with the axis of the stemming tube.

6. A mechanism for feeding a pear to a stemming tube comprising a shaft, means mounting a stemming tube in fixed position parallel to said shaft and spaced a predetermined radial distance therefrom, a carrier member mounted for rotation about the axis of the shaft and for movement longitudinally along said shaft, a cup pivotally mounted on said carrier member and adapted to receive and hold a pear with the stem-blossom axis of the pear spaced a predetermined angular distance from a position of parallelism with said shaft and with the pear disposed longitudinally of the shaft relative to the stemming tube, means connected to said cup for pivoting said cup through said predetermined angular distance to bring the pear to a position parallel with said shaft, means connected to said carrier member for rotating said carrier member to move the pear to a position of axial alignment with the stemming tube, and means for moving said carrier member longitudinally on said shaft to carry the pear in the cup toward said stemming tube.

7. A mechanism for feeding pears to stemming tubes comprising a shaft, means mounting a plurality of stemming tubes for movement to a transfer position, said transfer position being parallel to said shaft and spaced a predetermined distance radially therefrom, a hub mounted for rotation about the axis of said shaft and for longitudinal movement therealong, a plurality of cups mounted on said hub in angularly spaced relation with each other, each cup being adapted to receive and hold a pear in a position with the stem-blossom axis of the pear parallel to said shaft and spaced longitudinally relative to the stemming tubes and spaced said predetermined radial distance from said shaft, means for intermittently moving said stemming tubes and rotating said hub in timed relation to advance a stemming tube and a cup to the transfer position, and means for moving said hub longitudinally along said shaft to carry the pear in the cup at the transfer position toward the stemming tube in the transfer position.

8. A mechanism for feeding pears to stemming tubes comprising a rotatable first shaft, a turret mounted for rotation with said first shaft, a plurality of angularly spaced stemming tubes mounted on said turret and extending in longitudinal parallel relation to said first shaft, a second shaft mounted in spaced parallel relation to said first shaft, a carrier mounted for rotation about the axis of said second shaft, a plurality of cups pivotally mounted on said carrier in spaced angular relation about the axis of said second shaft, each cup being pivotally movable from a pear-receiving position spaced a predetermined angular distance from parallelism with said second shaft to a position wherein the axis of the cup is parallel to said second shaft, each cup being adapted to receive and retainingly engage a pear therein, means for intermittently moving said turret through predetermined increments of rotation, means for drivingly connecting said carrier to said turret for rotation therewith, means responsive to rotation of said carrier for moving a cup through said predetermined angular distance into a position parallel to said second shaft, the rotation of said turret and said carrier being so coordinated that a first increment of rotation of said carrier moves a first cup from said parallel position to an aligned position with a stemming tube simultaneously advanced to said aligned position by said turret, said first increment of rotation also being effective to move a second cup from said pear receiving position to a position of parallelism with said second shaft.

9. A feed mechanism for a fruit preparation machine comprising a control plate arranged to be periodically reciprocated along a fixed linear path, a stemming tube mounted in a fixed position parallel to said path, a pusher bar mounted on said control member for bodily movement therewith along the axis of the stemming tube and mounted for sliding movement relative to said control plate along the axis of the tube, a fruit carrier arranged to hold a piece of fruit with its core axis in alignment with the axis of the stemming tube and disposed between the stemming tube and the pusher, said carrier having one open end facing said pusher and another open end facing said stemming tube, means for moving said control plate forwardly to carry said pusher bar toward said carrier, camming means carried by said control plate, a lever operatively connected between said camming means and said carrier and arranged to move said carrier forwardly as said control plate moves forwardly, an actuating linkage operatively connected between said pusher and said control plate and arranged to move said pusher relative to said plate as said plate moves forwardly to project said pusher into one open end of said carrier to contact the fruit therein and push it forwardly onto said stemming tube.

10. A mechanism for feeding a pear to a stemming tube comprising means for holding a stemming tube with the axis of the tube in a fixed position, a shaft disposed in spaced relation from and parallel to the axis of said tube, a hub mounted for rotation about the axis of said shaft, means for rotating said hub, a rod rotatably mounted in said hub and extending outwardly therefrom, a mounting plate keyed to said rod, a rack slidably mounted on said hub, a gear secured to said plate and in mesh with the teeth of said rack to effect rotation of said plate through linear movement of said rack, a cam follower carried by said rack, a stationary cam fixed to said shaft and having a camming groove adapted to receive said follower and move the follower and the connected rack in a linear movement to pivot said plate through a fixed angular range as said hub is rotated through a predetermined increment of rotation, a cup carried by said plate and arranged to receive and align the stem-blossom end of a pear delivered thereto in predetermined angular relation with the axis of the stemming tube, the pivoting movement of said plate through said fixed angular range being effective to carry the pear to a position of parallelism with the axis of the stemming tube.

11. A mechanism for delivering individual pieces of fruit to a stemming tube at a transfer station comprising a plate mounted for reciprocating movement in a direction parallel to the axis of the tube, opposed jaws pivotally mounted on said plate and cooperating to define a generally cylindrical cup, means mounting said plate for movement transversely of the axis of the stemming tube from a first position wherein the axis of said cup is parallel to but spaced from the axis of the stemming tube to a second position wherein the cup is in alignment with the axis of the tube, an actuating arm operatively connected to both of said jaws, means for reciprocating said plate, abutment means disposed in the path of movement of said actuating arm as said plate moves forwardly at said first position, said actuating arm being arranged to move said jaws to open position when contacted by said abutment means, spring means for closing said jaws during rearward movement of said plate, means for moving said plate transversely to said second position, and a fixed contact member disposed in the path of forward movement of said actuating arm as said plate is moved forwardly at said second position, said contact member being arranged to engage said actuating arm and open said jaws as the fruit in said cup approaches the stemming tube.

12. A feed mechanism for a pear preparation machine having a stemming tube mounted in fixed axial position, said mechanism comprising a shaft mounted parallel to the axis of the stemming tube, a plate mounted on said shaft for reciprocating and rotational movement relative thereto, a first pair of opposed jaws pivotally mounted on said plate and cooperating to define a generally cylindrical opening adapted to receive the butt end of a pear, means for urging said jaws into retaining engagement with the sides of the pear adjacent the butt end, a second pair of opposed jaws pivotally mounted on said plate adjacent said first jaws, said second jaws being arranged to define a generally frusto-conical opening in axial alignment with the cylindrical opening and adapted to receive the tapered stem end of the pear, means for rotating said plate about the axis of its mounting and about the axis of said shaft to align the axis of the composite fruit receptacle defined by said pairs of jaws with the axis of the stemming tube, means for moving said plate longitudinally of said shaft to carry the pear in said cup toward the stemming tube, cam means in the path of longitudinal movement of said jaws for opening said second pair of jaws to release the stem end of said pear as said cup approaches the stemming tube, and means for pushing the pear from between said first pair of jaws and onto the stemming tube.

13. A fruit preparation machine comprising a turret mounted for rotation about a fixed axis, a plurality of stemming tubes mounted on said turret in angularly spaced parallel relation with each other for movement along a fixed circular path as said turret is rotated, a stationary shaft parallel to said fixed axis, a spline shaft rotatably journalled on said stationary shaft, a hub slidably disposed on said spline shaft, a plurality of pear receiving cups carried in spaced relation with each other on said hub for movement in a second circular path that intersects said first circular path, means mounting said cups for movement relative to said hub from a feed position wherein each cup is adapted to receive a pear in a substantially vertical position stem-end-down to a transfer position wherein the stem-blossom axis of the pear is parallel to the axes of the stemming tubes, means for moving said cups from said feed position to said transfer position, and means for intermittently rotating said turret and said spline shaft to bring a stemming tube into axial alignment with the axis of a pear in said transfer position, and means for shifting said hub along said spline shaft to move the cups toward the stemming tubes.

References Cited in the file of this patent

UNITED STATES PATENTS

| | | |
|---|---|---|
| 1,085,628 | Pease | Feb. 3, 1914 |
| 1,451,571 | Gay | Apr. 10, 1923 |
| 1,786,608 | Halstead | Dec. 30, 1930 |
| 1,909,813 | Crosbie | May 16, 1933 |
| 1,922,745 | Pease | Aug. 15, 1933 |
| 2,161,806 | Ewald | June 13, 1939 |
| 2,207,179 | Schreiber | July 9, 1940 |
| 2,321,590 | Ewald | June 15, 1943 |
| 2,335,239 | Gladfelter et al. | Nov. 30, 1943 |
| 2,335,620 | Thompson | Nov. 30, 1943 |
| 2,431,310 | Coons | Nov. 25, 1947 |
| 2,502,797 | Luhdorff et al. | Apr. 4, 1950 |